US009477779B2

(12) United States Patent
Webber et al.

(10) Patent No.: US 9,477,779 B2
(45) Date of Patent: Oct. 25, 2016

(54) GRAPH DATABASE DEVICES AND METHODS FOR PARTITIONING GRAPHS

(71) Applicant: NEO TECHNOLOGY, INC., San Mateo, CA (US)

(72) Inventors: James Webber, London (GB); Ian S. Robinson, London (GB); Mats Tobias Lindaaker, Malmo (SE); Alistair Philip Campbell Jones, London (GB)

(73) Assignee: NEO TECHNOLOGY, INC., San Mateo, CA (US)

( * ) Notice: Subject to any disclaimer, the term of this patent is extended or adjusted under 35 U.S.C. 154(b) by 102 days.

(21) Appl. No.: 14/214,002

(22) Filed: Mar. 14, 2014

(65) Prior Publication Data
US 2014/0280360 A1  Sep. 18, 2014

Related U.S. Application Data

(60) Provisional application No. 61/801,803, filed on Mar. 15, 2013.

(51) Int. Cl.
*G06F 17/30* (2006.01)

(52) U.S. Cl.
CPC ... *G06F 17/30958* (2013.01); *G06F 17/30584* (2013.01); *G06F 17/30587* (2013.01)

(58) Field of Classification Search
CPC .................. G06F 17/30958; G06F 17/30961; G06F 17/30584; G06F 17/30587
USPC ......................................... 707/791, 796–798
See application file for complete search history.

(56) References Cited

U.S. PATENT DOCUMENTS

| 2009/0083276 | A1 | 3/2009 | Barsness et al. |
| 2012/0016877 | A1* | 1/2012 | Vadrevu ............ G06F 17/30696 707/737 |
| 2013/0235040 | A1* | 9/2013 | Jackson, Jr. .......... G06T 11/206 345/440 |
| 2014/0149376 | A1* | 5/2014 | Kutaragi ............. G06K 9/6224 707/706 |

OTHER PUBLICATIONS

Averbuch et al."Partitioning Graph Databases A Quantitative Evaluation", KTH Computer Science and Communication; In Partitioning Graph Databases A Quantitative Evaluation; (XP055154140), 2013.
Renzo et el., "Survey of Graph Database Models"; (XP055086350), 2008.
Fortunato et al., "Community Detection in Graphs", Physics Reports, vol. 486, No. 3-5; pp. 75-174, (XP026856953); 2010.
International Search Report PCT/B2014/001476; Dec. 19, 2014.

* cited by examiner

*Primary Examiner* — Hares Jami
(74) *Attorney, Agent, or Firm* — Innovation Counsel LLP

(57) ABSTRACT

A method and apparatus for partitioning a graph database that includes nodes connected to one another is presented. The method entails determining a node type indicating a type of node that is to be used as mapped nodes, and upon receiving a new node, placing the new node in a partition according to one or more property values associated with the new node if it is a mapped node, and placing the new node in a partition according to its connections to other nodes if it is not a mapped node. The apparatus includes modules containing computer-executable instructions to perform the above method.

18 Claims, 3 Drawing Sheets

GRAPH DATABASE DEVICES AND METHODS FOR PARTITIONING GRAPHS

CROSS-REFERENCE TO RELATED APPLICATION(S)

This application claims the benefit of U.S. Provisional Patent Application No. 61/801,803 filed on Mar. 15, 2013, the content of which is incorporated by reference herein.

BACKGROUND

The inventive concept disclosed herein relates to graph database and in particular to partitioning a graph database.

A graph database is a database that uses graph structures with nodes, edges, and properties to represent data. A node may represent an entity such as a person, a business, an organization, or an account. Each node has one or more properties, or information that relates to the node. For example, if a node represents a person, the properties associated with that node may be the person's gender, age, name, and/or identification number of some kind. A graph database provides index-free adjacency, such that each element contains a direct pointer to its adjacent elements and there is no need to reference an external index.

Graph databases have various applications. For example, a graph database may be used in healthcare management, hospitality, transport, integrated circuit design, computer architecture design, and a social network system, to name a few.

Graph database methods may be used for partitioning graphs to allocate subsets of data to machines cooperating in a cluster. A cluster of machines is used to be able to handle larger datasets, often involving many millions—sometimes even billions—of nodes. However, this need for increased storage space conflicts with efficient query processing, as a query would typically be processed more efficiently within the context of a single machine (a "machine" is a computer/computing device including a processor and a memory). Queries processed across machine boundaries may be orders of magnitude slower than queries that execute in a single machine.

A method and system that allows queries to be processed in an efficient manner even involving a large dataset that spans across multiple machines is desired.

SUMMARY

In one aspect, the inventive concept pertains to a computer-implemented method of partitioning a graph database that includes nodes connected to one another. The method entails determining a node type indicating a type of node that is to be used as mapped nodes, and upon receiving a new node, placing the new node a partition according to one or more property values associated with the new node if it is a mapped node, and placing the new node in a partition according to its connections to other nodes if it is not a mapped node.

In another aspect, the inventive concept pertains to a non-transitory computer-readable medium storing instructions that, when executed, cause a computer to perform the above method of partitioning a graph database that includes nodes connected to one another, wherein each of the nodes is associated with at least one property value.

In yet another aspect, the inventive concept pertains to an apparatus for partitioning a graph database that includes nodes connected to one another wherein each of the nodes is associated with at least one property value. The apparatus includes a domain-specific pattern storage module storing a first set of instructions for determining a node type to be used as mapped nodes and a second set of instructions for identifying a node as a connected node, a graph partitioning module storing instructions for placing a new node into one of a plurality of partitions, and a partitioned graph storage module configured to store information about nodes including their property values, and interconnections between nodes in a partition.

DETAILED DESCRIPTION

Figure 1:
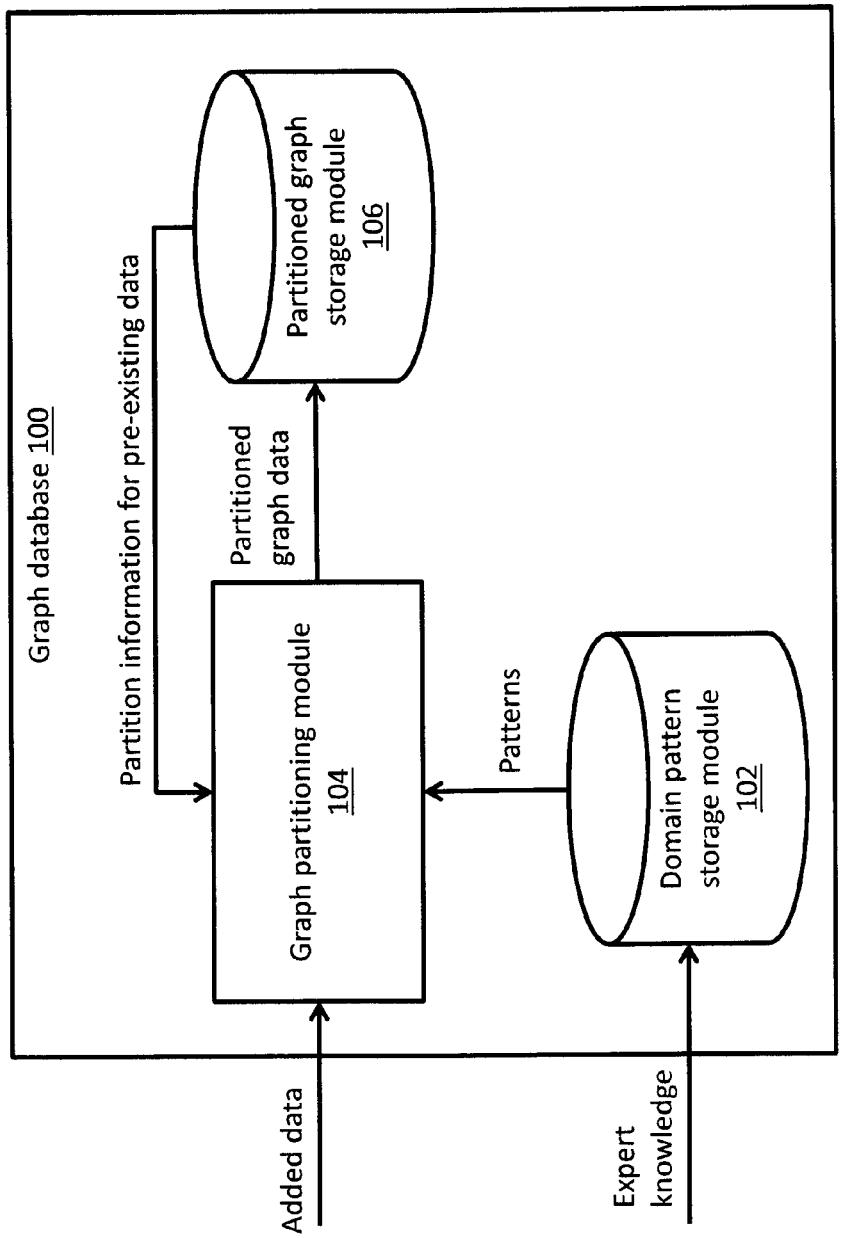
FIG. 1 schematically illustrates a graph database device in accordance with an embodiment of the inventive concept.

The inventive concept will now be described in detail with reference to a few embodiments thereof as illustrated in the accompanying drawings. In the following description, numerous specific details are set forth in order to provide a thorough understanding of the inventive concept. It will be apparent, however, to one skilled in the art, that the concept disclosed herein may be practiced without some or all of these specific details. In the interest of clarity, detailed descriptions of well-known processes and/or structures will be omitted.

Although the terms first, second, etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer, or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms first, second, third etc. may also be used herein to differentiate different categories of elements. For conciseness, the terms first, second, etc. may represent first-category, second-category, etc., respectively.

As used herein, a "direct" connection between Node A and Node B is intended to mean a connection between the two nodes with no intervening nodes. An "indirect" connection between Node A and Node B, on the other hand, is intended to mean that there is one or more intervening nodes between Nodes A and B (e.g., Node A is connected to Node X, which is connected to Node Y, which is connected to Node B).

Graph partitioning is used in many computing disciplines, either as a precursor to some other computing activity or as a useful end in itself. For example, a partitioned graph allows for efficient scheduling of computer resources. When analyzing large volumes of graph data, partitioning may be used to gain insight into the graph's structure and contents.

Graphs, however, are difficult to partition. Generally, graph partitioning is considered an NP-hard problem, which means it cannot be solved in a reasonable period of time and cannot be proven to have worked in a reasonable amount of time. On a practical level, an NP-hard problem might be characterized as an impossible problem for any reasonably-sized data set. This leaves one to resort to a probabilistic approach. A probabilistic approach does not have to be, and is usually not, correct for all cases—it is simply good enough for a majority of cases.

The inventive concept disclosed herein includes a graph partitioning process that aims to minimize the number of partitions involved in each query and each transaction. The process may be domain-agnostic and generally less expensive than a conventional-type solution. In one aspect, the data/graph is partitioned based on the nature and characteristics of the domain in which the graph data is based. For many business domains, a domain expert is able to describe how the graph will be updated and queried. Based on this description, a partitioning scheme is constructed that minimizes the number of partitions involved in each query and each transaction. Due to the fact that a partition scheme is tailored to a specific domain, each partition scheme performs well under a specific, predefined set of conditions. As a partition scheme is domain-specific, it does not have to work well when applied to a different domain.

Once a partition scheme is constructed, a logical set of partitions exist and a partition is determined/assigned for each node that is added to the graph. The scheme may choose a partition for a set of nodes based on their property values as evaluated in the context of a domain expert's description of the graph. This set of nodes that are placed in partitions based on their property values is referred to as "mapped nodes." Other nodes in the graph are connected to one or more mapped nodes, directly or indirectly, and these nodes are herein referred to as "connected nodes." The scheme places connected nodes in partitions based on the number, type, and/or depth of their connections to mapped nodes. "Depth," as used herein, indicates the degree of separation between nodes—the higher the degree of separation, the "deeper" the connection.

In some embodiments, the partitioning scheme stores only nodes that are either mapped or connected. On a practical level, this is usually not a limitation with a serious impact because any unmapped, unconnected nodes are usually not accessed by a query. This technique may be useful for conserving storage and/or computation resources.

Embodiments of the inventive concept will now be described in the context of healthcare domain. The healthcare context is used as an example domain to aid in the illustration of the inventive concept, and is not a limitation of the possibilities or applications of the inventive concept. In setting up a partitioning scheme for healthcare industry, an essential entity type is first identified so that mapped nodes can be defined. An analysis of queries and transactions that are handled by the industry may indicate that in this field, updates and queries are most commonly centered around a single patient. Hence, a partitioning scheme that prioritizes keeping data connected to the individual patients in a single partition may be constructed.

In this situation, mapped nodes would be nodes representing patients. Now that the node type for mapped nodes is determined, at least one property value is selected as a basis for partitioning. For example, where each mapped node represents a patient and one of the properties of the mapped node is the patient's residential address, the zip code, city, state, province, zipcode/postal code, or country in the address may be used to map the patients to partitions. The partitioning scheme may be executed based on a composite or combination of properties, such as zipcode and age. Patterns of nodes that should be mapped to a single partition may be derived and used as a basis for the partitioning.

One way to implement the partitioning scheme is with the syntax from a Cypher query language to declare the characteristic(s) that should be used to map nodes to a partition. For example, the line KEY :Person (name) would map from the name property of a person node, such that people with the same name get mapped in the same partition, and people with different names get mapped to different logical addresses. To use both name and age properties for partitioning, the line KEY :Person (name, age) may be used so that each partition includes people with the same name and age.

Going back to the above context where people (patients) are mapped to partitions according to their address, lines such as the following may be used:

```
KEY :Country(code), :Address(postcode)
CLUSTER (:Patient) - [:LIVES_AT] -> (:Address) - [:IN] ->
(:Country)
```

Based on this definition of mapped nodes and how to place them in partitions, the partitioning scheme automatically identifies a new node as a mapped node (a patient node) and places it in the partition that matches the address property.

If a new node is not a mapped node (e.g., if it is a connected node), the partitioning scheme will apply a different pattern or set of rules. For example, a new connected node may be placed in a partition based on the number of connections it has in each of the partitions and the depth of those connections. For example, if Patient P is directly connected to Dr. A and is indirectly connected to Dr. B through Staff 1 and RN 2, and Dr. A and Dr. B are in different partitions, the node that represents Patient P will likely be placed in the same partition as Dr. A because Patient P's connection to Dr. B is deeper (more indirect).

If, in the above situation, Patient P's connection to Dr. A and Dr. B were of the same depth, other factors such as the number of Patient P's connections to other nodes in Dr. A's partition vs. the number of Patient P's connections to other nodes in Dr. B's partition would determine to which partition Patient P's node gets assigned.

FIG. 1 shows a schematic block diagram illustrating a graph database device 100 in accordance with an embodiment of the inventive concept. As shown, the graph database device 100 may include a domain pattern storage module 102, a graph partitioning module 104, and a partitioned graph storage module 106.

The domain pattern storage module 102 may store patterns (e.g., entity types and property values associated with the entity types) that are generated based on analysis of queries and transactions performed in one or more particular domains. For example, in setting up the graph database device 100 for a healthcare management domain, if it is the case that updates and queries in the healthcare domain are most commonly associated with patients, the graph database device 100 may be constructed with a patient being an essential entity type (mapped nodes) and doctors, nurses, hospitals, encounters, etc. being connected. The patient nodes may be updated with new data (e.g., a new diagnosis, a recent procedure that was done) regularly or periodically. Generally, new data may be added as a new, connected node or as a new property on the original node, or as a change to an existing property on the original node. In the case where the new data is a new diagnosis or a recent procedure, it may be added as a new connected node.

The partitioned graph storage module 106 stores partition information for data that is already in the graph database device 100. For example, the partitioned graph storage module 106 may store information about how many partitions there currently are. When a new node (e.g., a patient, a doctor, a nurse) is received by the graph database device 100, the graph partitioning module 104 applies the partitioning scheme stored in the domain pattern storage module 102 in real-time to place the new node in the best partition. Although the partitioning scheme determines the logical existence of a set of partitions, a partition may be physically instantiated or created as new nodes are placed in new partitions. The graph partitioning module 104 uses the properties of the new node, the pattern in the pattern storage module 102, and data about the pre-existing partitions from the partitioned graph storage module 106 to place a new node.

As mentioned above, nodes associated with the essential entity type are herein referred to as "mapped nodes," and nodes connected to the mapped nodes are referred to as "connected nodes."

The domain pattern storage module 102, the graph partitioning module 104, and the partitioning graph storage module 106 shown in FIG. 1 may be implemented in the same hardware components or may be implemented in interconnected hardware components.

Figure 2:
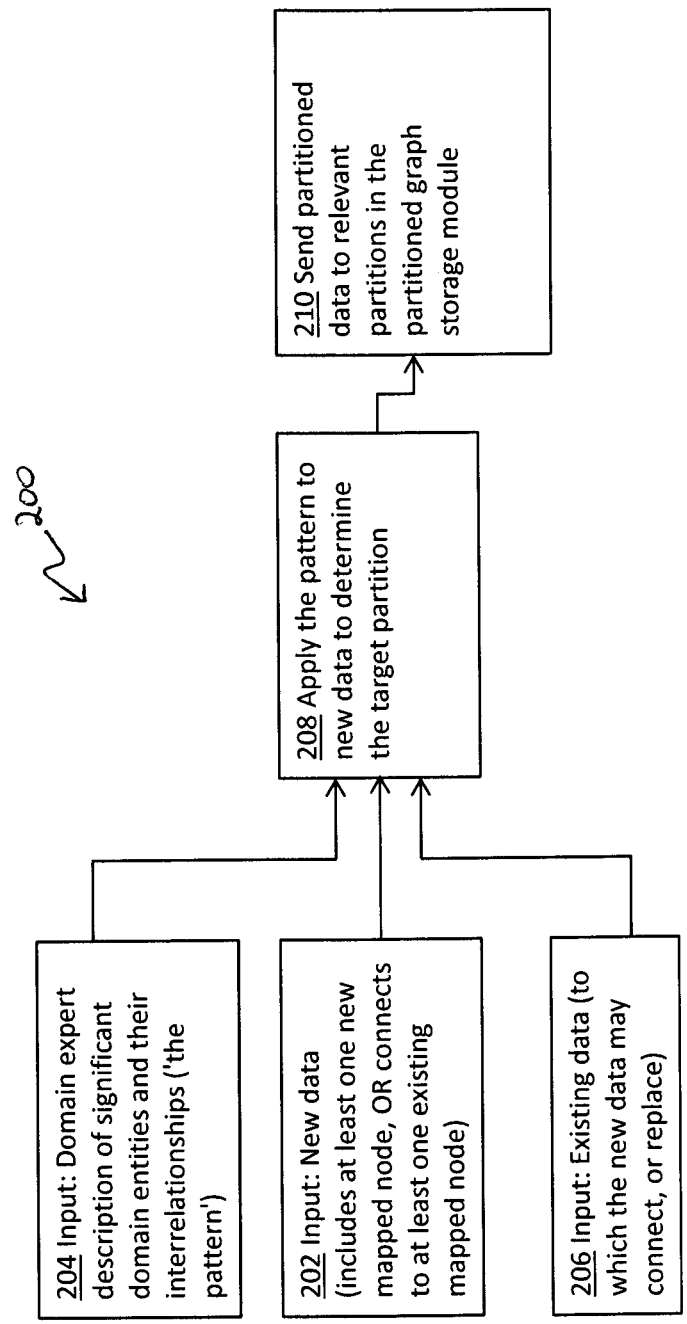
FIG. 2 is a flowchart illustrating a method for partitioning a graph in accordance with one or more embodiments of the inventive concept.

FIG. 2 is a flowchart illustrating a partitioning process 200 for partitioning a graph in accordance with an embodiment of the inventive concept. The partitioning process 200 may be performed by the graph database device 100. As shown in the figure and mentioned above, the partitioning scheme uses multiple pieces of information to apply the partitioning scheme (i.e., place a new node in a partition): properties of the new node, the pattern, and data that about the already-existing partitions.

Data about the new node may be manually input by a person or obtained from an external software application (e.g., a hospital software and database) by the graph database device 100. A new node (in step 202) may be a mapped node or a connected node. Whether the new data will be a mapped node or a connected node, and which partition it will be in, is determined according to the pattern. As mentioned above, the pattern may apply a different rule/scheme to the mapped nodes than to the connected nodes. For example, the mapped nodes may be placed in partitions according to their property values (e.g., address), while connected nodes may be placed in partitions according to the number and depth of their connections to other nodes.

The pattern may be retrieved from the pattern storage module 102 (step 204). As mentioned above, the pattern is based on the characteristics for a specific domain relating to entities and their interrelationships. The pattern may, for example, prescribe that the mapped nodes be patients, and connected nodes be patients, doctors, encounters, and hospitals. The pattern may also prescribe that the partition assignments for the mapped nodes be made according to geography (e.g., residential address of each patient) based on the domain expert's statement that patients tend to choose doctors who are close by. As for how to assign connected nodes to partitions, the pattern may prescribe that the assignments be made according to the residential address associated with each connected node and the depth of connections to different mapped nodes.

Information about pre-existing data may be retrieved, for example from the partitioning graph storage module 106. The pre-existing data pertain to which nodes are currently placed in what partition, and has information about connections between nodes. In some embodiments, the pre-existing data may also include property value information about the nodes that are already in the partitioned graph.

In some embodiments, receipt of a new node (step 202) may trigger the partitioning scheme to be applied (step 208), although this is not a limitation of the inventive concept. The partitioning scheme assigns nodes to partitions based on a determination that the new node is most likely to be part of a query that involves the data in that partition. The partitioning scheme, as mentioned above, is based on how to minimize processing queries or transactions involving across machine borders. Steps 202, 204, and 206 may be performed simultaneously, sequentially, or with a partial temporal overlap. After the partitioning scheme is applied to new data (step 208), the new partition data is sent to the graph storage module 106 for storage (step 210). The data in each partition may be stored in a single machine (e.g., a computer including a storage medium) for efficient query processing. Where there are multiple copies of a partition, each copy may be stored in a single machine.

Figure 3:
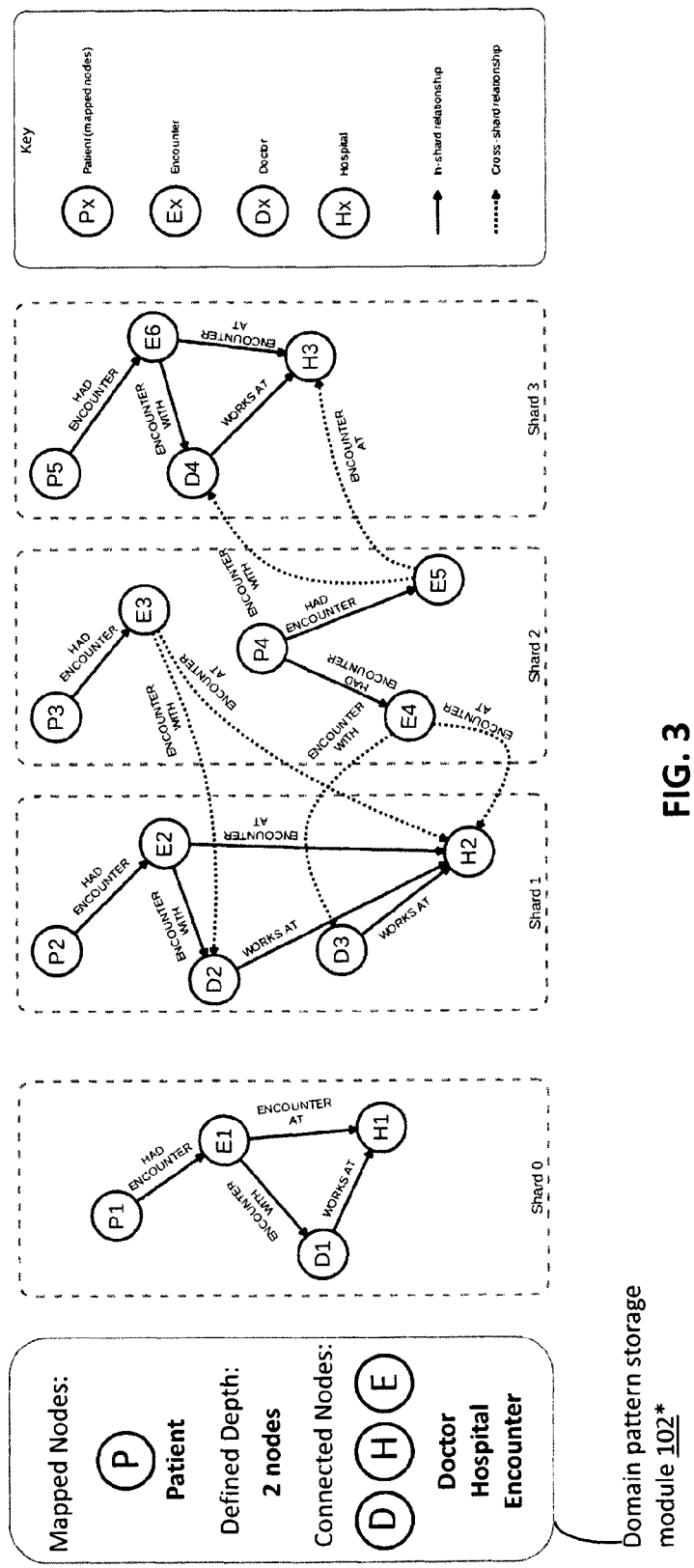
FIG. 3 is a schematic representation of a partitioned graph in accordance with an embodiment of the inventive concept.

FIG. 3 shows a schematic representation of a partitioned graph in accordance with an embodiment of the inventive concept. In the particular example, the partitioned graph is related to a healthcare management domain. In FIG. 3, a partition is expressed as a "shard," which is a portion of the graph that resides in one machine.

As mentioned before, mapped nodes may be placed in partitions based on a different rule than connected nodes. In the particular example, mapped nodes—patients—are placed in partitions based on the address indicated in their property values. Connected nodes—encounter nodes Ex, doctor nodes Dx, and hospital nodes Hx—may be placed in partitions based on their connections. On a practical level, where the partitions are based on geography, the connected nodes may end up in partitions that are consistent with their address properties because patients tend to go to hospitals that are close to their homes.

Let's suppose a situation where three partitions have thus far been set up based on geography, according to the pattern: Shard 0 for Area 1, Shard 1 for Area 2, and Shard 2 for Area 3. Patient 1 (P1), Patient 2 (P2), and Patient 3 (P3) whose address properties indicate Area 1, Area 2, and Area 3 as their respective residential addresses are assigned to Shards 0, 1, and 2, respectively. As nodes representing doctors, hospitals, and hospital staff members are received, they will be placed in partitions based on their connections. Depending on the domain and the characteristics of the domain, there are different options for connection-based partitioning.

In one example, a connected node may be placed in the same shard as the mapped node that is the most closely connected to the connected node. For example, in FIG. 3, when doctor node D2 is added, it is added to Shard 1 because the mapped node that is most closely connected to it is patient P2 in Shard 1. In some embodiments, a new node directly connected to a mapped node may be placed in the same partition as the mapped node. For example, as illustrated in FIG. 3, encounter to patient path is always the shortest (least deep, or "shallowest") path to a mapped node, and encounter nodes Ex may always be placed in the same shard as respective corresponding patient nodes Px.

In other cases, a connected node may be placed in the same shard as the mapped node even if it does not have the shortest path to that mapped node. This can happen, for example, if the mapped node is the first mapped node (temporally) to which the connected node is linked. For example, in FIG. 3, let's suppose that patient node P2 is connected to doctor node D2. Later, if doctor D2 becomes directly connected with patient P5 (such that the doctor D2 has a shorter path to patient P5 than to patient P2), doctor node D2 may remain in Shard 1.

In some embodiments, a connected node is placed based on the number of connections it has in each partition. Referring again to FIG. 3, hospital H2 has three direct connections in Shard 1 (to Ew, Dw, and De) and two direct connections to Shard 2 (E3 and E4). In the particular example, hospital H2 is placed in Shard 1, perhaps based on the fact that it has a higher number of direct connections in Shard 1 than in Shard 2.

Another embodiment may place hospital H2 in Shard 2, for example if it is based on the maximum number of patient connections. Looking at FIG. 3, hospital H2 is only connected to patient P2 in Shard 1 but connected to patients P3 and P4 in Shard 2. Hence, if the partitioning scheme places connected nodes in the partition where they have the maximum number of patient connections, hospital H2 would have been placed in Shard 2.

When connected nodes are connected to only one mapped node, they are placed in the same shard as the mapped node. (In the example of FIG. 3, the patient nodes are the mapped nodes.) As illustrated in FIG. 3, nodes E1, D1, and H1 are placed in Shard 0 where patient node P1 is located.

As can be appreciated from the foregoing discussion, embodiments of the invention may utilize domain expert knowledge to identify nodes of the essential entity type (mapped nodes) and nodes having shortest paths to the essential nodes (connected nodes) when partitioning a graph. As a result, the number of partitions (shards) involved in each query and/or each transaction may be minimized. Each partition/shard residing in a single machine, the partitioning process disclosed herein minimizes cross-machine processing of graph database queries and transactions. Advantageously, efficiency for data updating, querying, and/or processing may be optimized, and resources may be conserved.

Various embodiments are described herein below, including methods and techniques. It should be kept in mind that the inventive concept might also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the inventive concept may also cover apparatuses for practicing embodiments of the concept that is disclosed. Such apparatus, herein also referred to as "machines," may include circuits, dedicated and/or programmable, to carry out operations pertaining to embodiments of the inventive concept. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments of the invention.

It should be understood that the inventive concept can be practiced with modification and alteration within the spirit and scope of the disclosure. The description is not intended to be exhaustive or to limit the inventive concept to the precise form disclosed.

What is claimed is:

1. A computer-implemented method of partitioning a graph database, wherein the graph database includes nodes connected to one another, comprising:
   determining a node type indicating a type of node that is to be used as mapped nodes; and
   upon receiving a new node, placing the new node in a partition according to one or more property values associated with the new node if it is a mapped node, and placing the new node in a partition according to at least one of: its number of connections to other nodes, depth of its connections to other nodes, and attributes of the other nodes to which the new node will be connected if the new node is not a mapped node.

2. The method of claim 1, wherein the type of node to be used as mapped nodes is determined based on characteristics of a field to which the graph database pertains.

3. The method of claim 2, wherein determining the node type to be used as mapped nodes comprises identifying an essential entity type around which queries are received in the field.

4. The method of claim 1, wherein placing the new node comprises creating a physical partition for the new node.

5. The method of claim 4, wherein placing the new node in one of the partitions comprises:
   determining whether the new node is a mapped node;
   determining whether the new node belongs in one of the pre-existing partitions based on its property value; and
   creating the new partition if the new node does not belong in any of the pre-existing partitions.

6. The method of claim 1, wherein the new node is not a mapped node, further comprising placing the new node in the same partition as the mapped node to which it is connected with least depth.

7. The method of claim 6, wherein the new node has same depth of connection to two different mapped nodes, further comprising placing the new node in the partition where the new node has a higher number of connections between partitions of the two different mapped nodes.

8. The method of claim 6, further comprising placing the new node in the partition where the new node has the highest number of connections to mapped nodes.

9. The method of claim 1, wherein a partition is stored in a single storage medium.

10. A non-transitory computer-readable medium storing instructions that, when executed, cause a computer to perform a method of partitioning a graph database that includes nodes connected to one another, the instructions comprising:
    an instruction to determine a node type indicating a type of node that is to be used as mapped nodes;
    an instruction to, upon receiving a new node, place the new node in a partition according to one or more property values associated with the new node if it is a mapped node, and place the new node in a partition according to at least one of: its number of connections to other nodes, depth of its connections to other nodes, and attributes of the other nodes to which the new node will be connected if the new node is not a mapped node.

11. The non-transitory computer-readable medium of claim 10, further comprising an instruction to determine the type of node to be used as mapped nodes based on characteristics of a field to which the graph database pertains.

12. The non-transitory computer-readable medium of claim 10, wherein the instruction to determine the node type to be used as mapped nodes comprises an instruction that identifies an essential entity type around which queries are received in the field.

13. The non-transitory computer-readable medium of claim 10, wherein the instruction to place the new node comprises an instruction to create a new partition for the new node.

14. The non-transitory computer-readable medium of claim 13, wherein the instruction to place the new node in one of the partitions comprises:
   an instruction to determine whether the new node is a mapped node;
   an instruction to determine to which logical partitions the new node belongs based on its property value; and
   an instruction to create a new physical partition that correlates with one of the logical partitions if such physical partition is not already in existence.

15. The non-transitory computer-readable medium of claim 10, wherein the new node is not a mapped node, further comprising an instruction to place the new node in the same partition as the closest mapped node to which it is connected.

16. The non-transitory computer-readable medium of claim 15, wherein the new node has same depth of connection to two different mapped nodes, further comprising an instruction to place the new node in the partition where the new node has a higher number of connections between partitions of the two different mapped nodes.

17. The non-transitory computer-readable medium of claim 15, wherein the new node has same depth of connection to two different mapped nodes, further comprising an instruction to place the new node in the partition where the new node has a higher number of direct connections between partitions of the two different mapped nodes.

18. The non-transitory computer-readable medium of claim 10, wherein data in each of the partitions is stored in a single storage medium.

* * * * *